United States Patent [19]
Wilson

[11] Patent Number: 5,812,294
[45] Date of Patent: Sep. 22, 1998

[54] LINEARIZED OPTICAL TRANSMITTER

[75] Inventor: Gordon Cook Wilson, New York, N.Y.

[73] Assignee: Lucent Technologies Inc., Murray Hill, N.J.

[21] Appl. No.: 694,651

[22] Filed: Aug. 7, 1996

Related U.S. Application Data

[63] Continuation-in-part of Ser. No. 657,117, Jun. 3, 1996, abandoned.

[51] Int. Cl.$^6$ .................................................. H04B 10/00
[52] U.S. Cl. ............................ 359/161; 359/180; 375/296
[58] Field of Search ........................... 359/161, 173, 359/180, 188, 195; 375/296; 455/63

[56] References Cited

U.S. PATENT DOCUMENTS

| | | | |
|---|---|---|---|
| 5,361,156 | 11/1994 | Pidgeon | 359/161 |
| 5,373,384 | 12/1994 | Hebert | 359/161 |
| 5,436,749 | 7/1995 | Pidgeon, Jr. et al. | 359/161 |
| 5,453,868 | 9/1995 | Blauvelt et al. | 359/173 |

FOREIGN PATENT DOCUMENTS

| | | | |
|---|---|---|---|
| 0600553 | 6/1994 | European Pat. Off. | 359/161 |

OTHER PUBLICATIONS

"Progress in Externally Modulated AM CATV Transmission Systems", M. Nazarathy et al,J. Lightwave Technology., vol. 11, pp. 82–104 (1993).

*Primary Examiner*—Kinfe-Michael Negash
*Attorney, Agent, or Firm*—Brian K. Dinicola; Jeffery J. Brosemer

[57] ABSTRACT

A linearized optical transmitter in which predistortion is employed to cancel both third and fifth order intermodulation distortion includes a modulated optical source responsive to a time varying electrical input signal to supply a time varying optical output signal containing multiple subcarrier signals. The modulated optical source is characterized by a non-linear transfer function such that intermodulation of the multiple subcarrier signals occurs, and for this reason, the optical transmitter further includes a predistortion circuit for supplying a predistorted signal comprising both the multiple subcarrier signals and intermodulation products substantially equal in magnitude and opposite in phase to those associated with the non-linear transfer function such that odd-order subcarrier intermodulation distortion products in the optical output signal are substantially canceled through the fifth order.

18 Claims, 10 Drawing Sheets

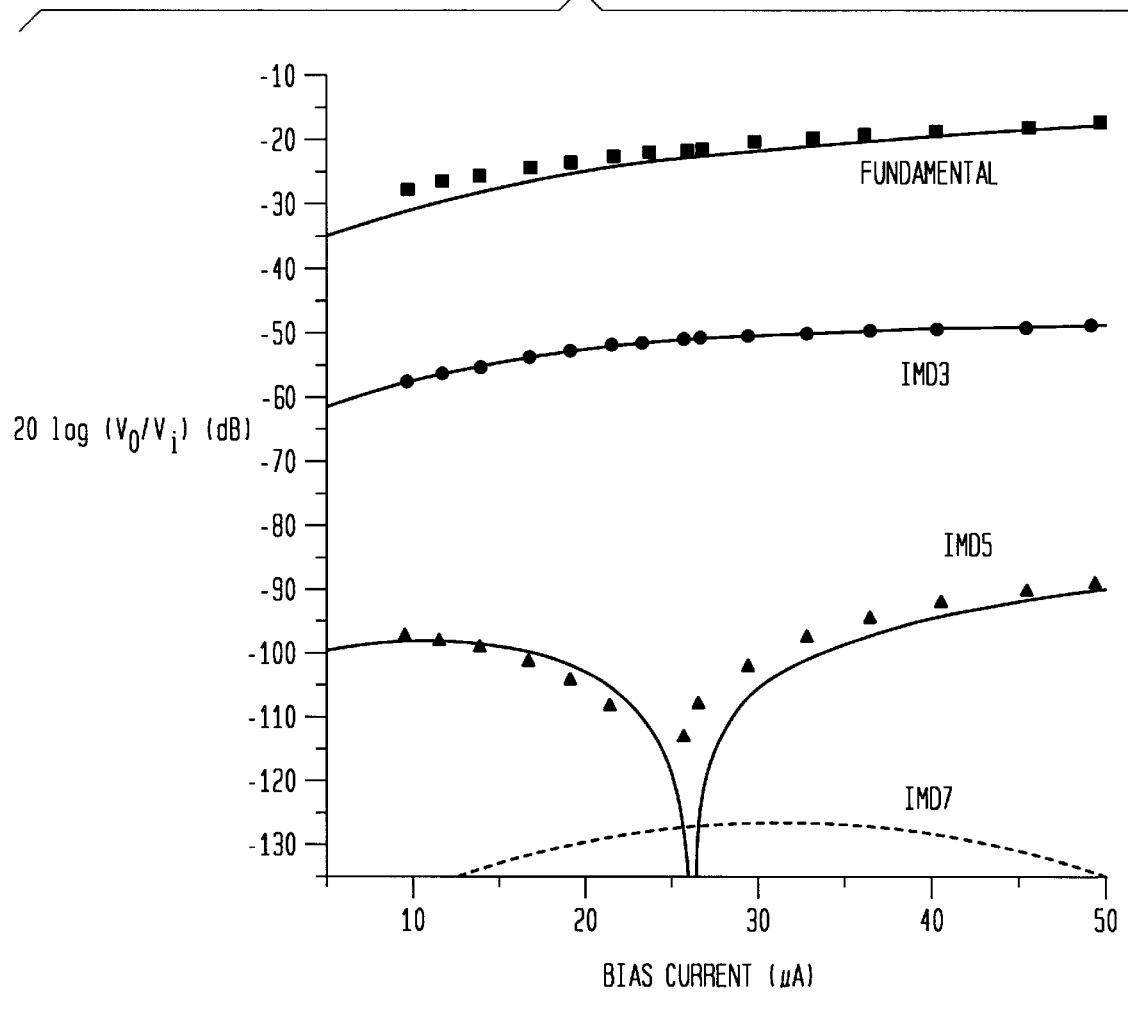

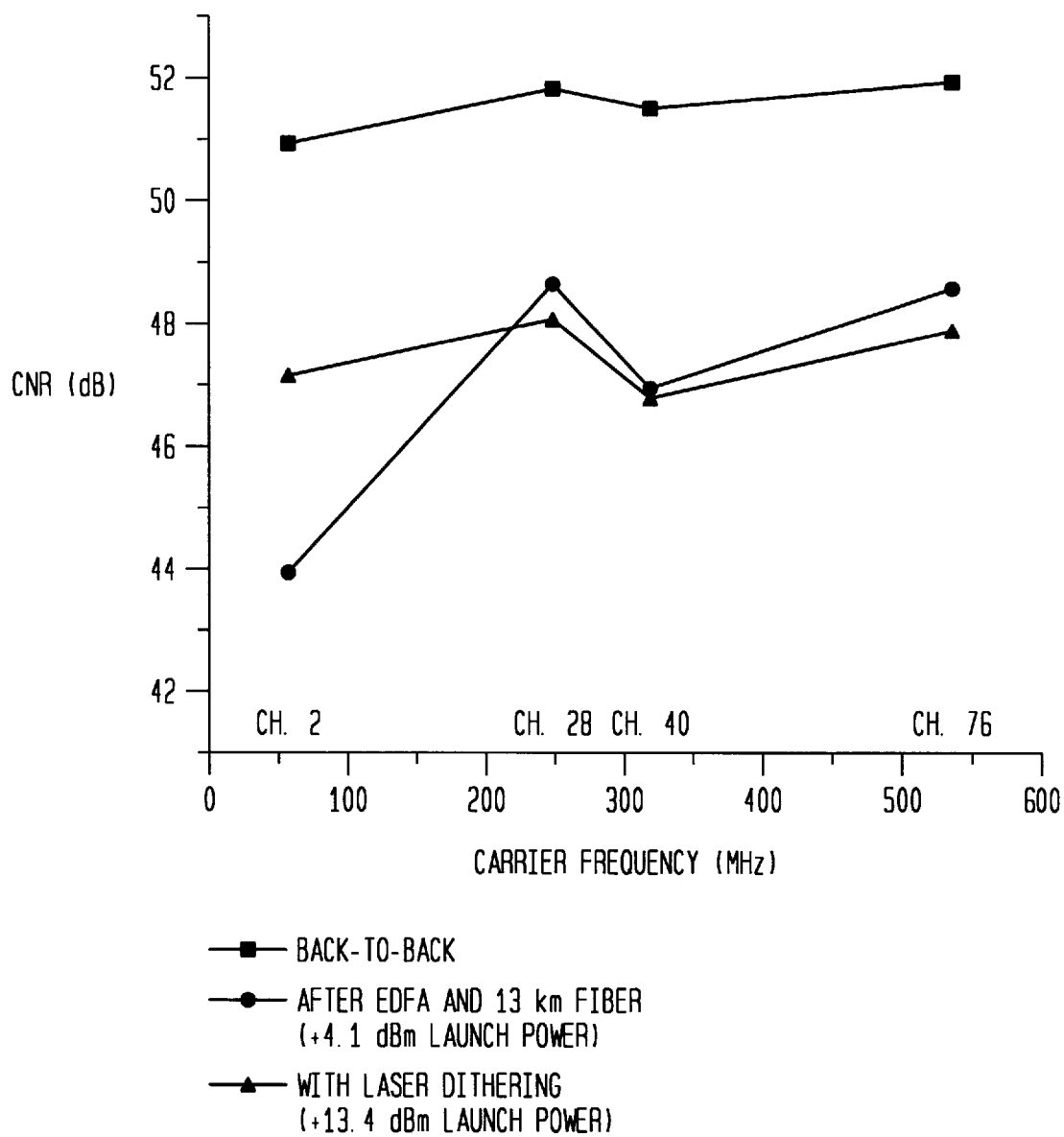

LINEARIZED OPTICAL TRANSMITTER

REFERENCE TO RELATED APPLICATION

This application is a continuation-in-part of U.S. patent application Ser. No. 08/657,117, filed Jun. 3, 1996 now abandoned.

FIELD OF THE INVENTION

The present invention relates to optical communication systems employing multiple subcarriers and, more particularly, to optical sources and techniques for use in such systems.

DESCRIPTION OF THE BACKGROUND ART

Various optical transmission systems have been proposed comprising directly modulated DFB lasers, optical amplifiers, and single mode optical fiber links. For example, AM-VSB cable TV (CATV) systems operating at 1.55 µm with erbium-doped fiber amplifiers (EFDA's) are of significant interest because they are operable to provide high optical powers and enable large splitting ratios. Disadvantageously, however, the chirp produced by directly modulated lasers at 1.55 µm leads to distortion in non-dispersion shifter fiber and in EDFAs having a gain which varies with wavelength. Thus, either dispersion compensation or external modulation is typically required.

For networks that split into branches of variable lengths, the task of installing appropriate lengths of dispersion compensating fiber in each branch is cumbersome and complicates the expansion of an existing network. An externally modulated source obviates the need for dispersion compensation. Currently, $LiNbO_3$ Mach-Zehnder modulators are used commercially and offer high performance at premium cost. Integrated electroabsorption modulated lasers (EMLs) also have low chirp, are compact, and potentially less expensive. Transmission through non-dispersion shifted fiber, without dispersion compensation and with negligible degradation of signal quality, has been demonstrated using both a linearized EML and a linearized discrete electroabsorption (EA) modulator. Biasing the modulator at the inflection point of its transmission-vs. voltage curve produces low composite second order distortion for at least some devices. The odd-order non-linearity, parameterized by the composite-triple-beat (CTB), is high, however, and must be corrected by linearization.

Various techniques of linearization have been proposed. It has, for example, been noted that an electroabsorption modulator is quite linear in current since the photocurrent produced is proportional to the light absorbed. Linearization by current modulation has, in fact, been demonstrated at frequencies up to 10 Mhz. It is expected, however, that extending the linearization range to 600 Mhz will present a significant technical challenge. Linearization by feedforward has also been demonstrated. In general, however, using a second modulated laser to cancel, at the receiver, the distortion produced by the primary transmitting laser is problematic at wavelengths where dispersion is significant since, if the wavelengths of the two lasers are not exactly the same, the two signals will arrive at the receiver having undergone different delays.

Given the limitations associated with the aforementioned techniques, predistortion is presently the predominant technique for linearizing directly modulated lasers and Mach-Zehnder modulators and it is currently regarded as being the most promising technique for linearizing EA modulators as well. In a paper by M. Nazarathy et al. entitled "Progress in Externally Modulated AM CATV Transmission Systems", J. Lightwave Technology., vol. 11, pp. 82–104 (1993), there is described a CTB correction technique in which the linearizer inserted between the transmitter RF input and the electro-optic modulator is configured to provide predistortion correction of the output optical signal. Essentially, the modulator and linearizer transfer characteristics are modeled by an odd-function, power series expansion, and the authors report distortion cancellation up to the third order term of the expansion. Disadvantageously, the Nazarathy et al. reference does not disclose a technique by which the contributions of fifth order intermodulation distortion may be independently addressed.

SUMMARY OF THE INVENTION

The aforementioned deficiencies are addressed, and an advance is made in the art, by a linearized optical transmitter in which predistortion is employed to cancel both third and fifth order intermodulation distortion attributable to the non-linear transfer function of a modulated optical source. The modulated optical source, which may comprise an integrated electroabsorption modulator laser (EML) or a distributed feedback laser modulated by a discrete electroabsorption (EA) modulator, is responsive to a time varying electrical input signal to supply a time varying optical output signal containing multiple subcarrier signals for transmission to one or more remote receivers via an optical medium such, for example, as a non-dispersion shifted optical fiber.

The optical transmitter according to the present invention further includes a predistortion circuit for supplying a predistorted signal comprising both the multiple subcarrier signals and intermodulation products substantially equal in magnitude and opposite in phase to those associated with the non-linear transfer function such that odd-order subcarrier intermodulation distortion products in the optical output signal are substantially canceled through the fifth order.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

A more complete understanding of the invention may be obtained by reading the following description of specific illustrative embodiments of the invention in conjunction with the appended drawing in which:

FIGS. 5A and 5B are graphical plots showing experimental two-tone intermodulation distortion (IMD) generated by the diode pair up to fifth order and theoretical IMD up to seventh order for different input voltage levels;

FIG. 9 depicts CNR at various points in the link of the investigative apparatus of FIG. 5.

DETAILED DESCRIPTION OF THE INVENTION

Figure 1:
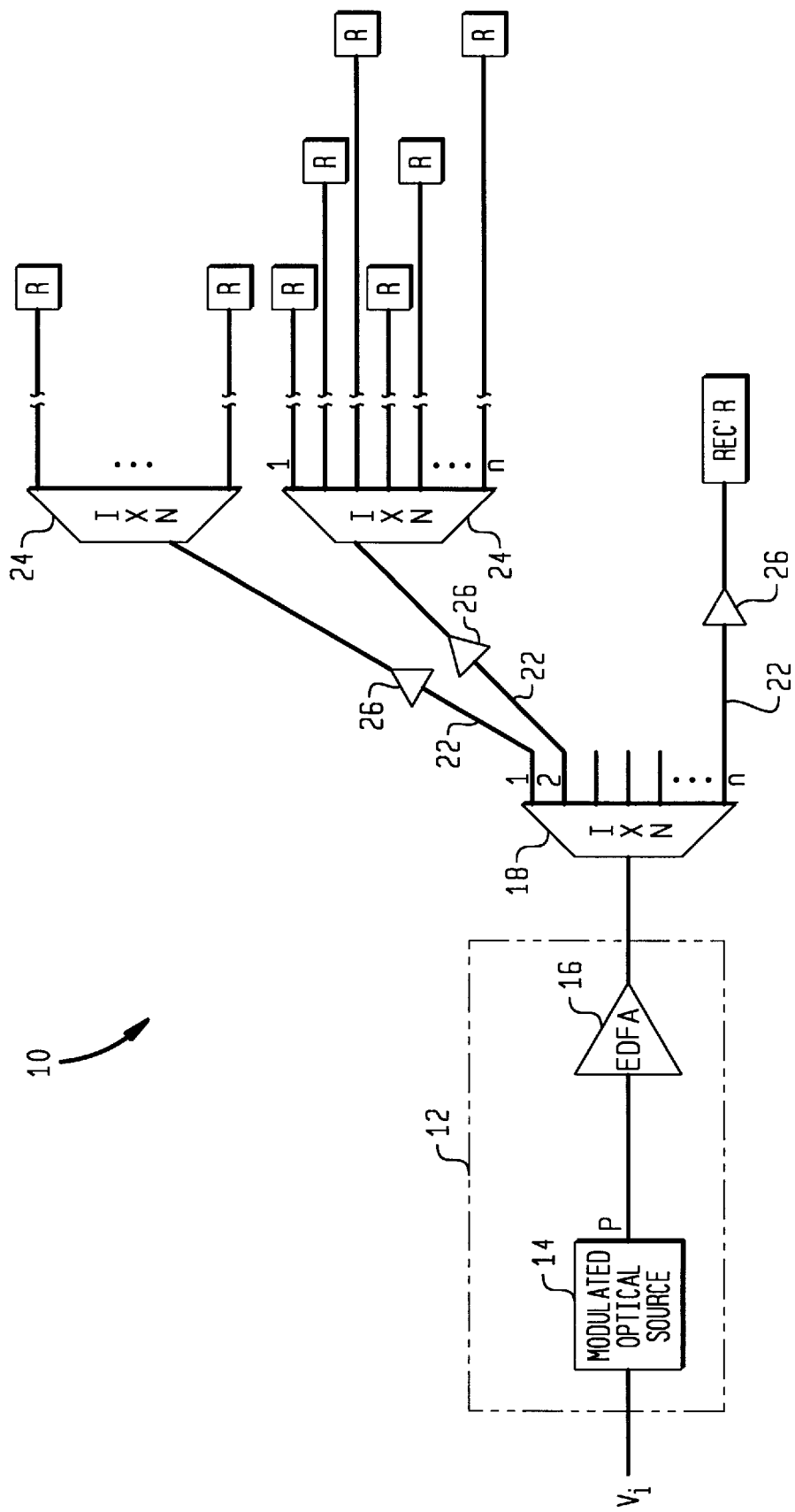
FIG. 1 shows an optical source distribution network employing a linearized optical transmitter in accordance with the present invention.

Referring now to the drawings and initially to FIG. 1 thereof, an optical source distribution network employing a linearized optical transmitter 12 constructed in accordance with an illustrative embodiment of the present invention is shown and designated generally by the reference numeral 10. In the illustrative embodiment of FIG. 1, transmitter 12 is located at the central office (CO) of a CATV network. Modulated optical source 14, which forms part of transmitter 12, is responsive to a time varying electrical input signal $v_i$ to supply a time varying optical output signal P that contains multiple subcarriers. In accordance with the present invention, odd-order subcarrier intermodulation distortion products that would otherwise be present in the output signal P are substantially cancelled through the fifth order.

In the illustrative distribution network depicted in FIG. 1, the output of the transmitter is amplified by an amplifier such as an erbium-doped fiber amplifier (EDFA) 16 and supplied to a 1×N power splitter 18 for transmission to a plurality of receivers 20 via respective optical communication links 22. As will be readily appreciated by those skilled in the art, extensive power splitting and amplification may be employed in order to serve a large number of subscriber locations. For illustrative purposes, one additional stage of power splitters 24 and optical amplifiers 26 is shown in FIG. 1.

Figure 2:
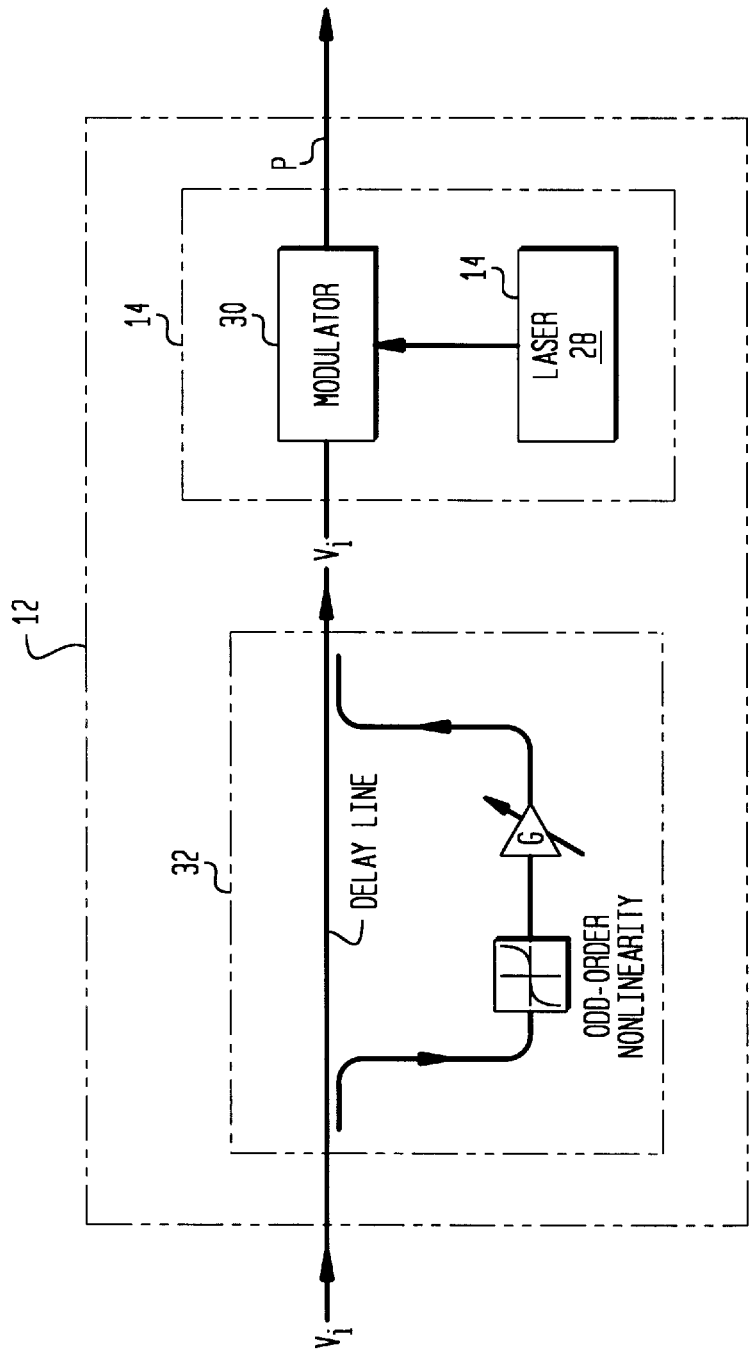
FIG. 2 depicts a linearized optical transmitter constructed in accordance with an illustrative embodiment of the present invention.

With reference now to FIG. 2, the linearized optical transmitter according to the present invention will now be described in detail. In the illustrative embodiment of FIG. 2, the modulated optical source 14 of transmitter 12 comprises a distributed feedback laser 28 that operates in a wavelength range centered about 1.55 μm and that is directly modulated by an integrated electroabsorption modulator 30. The input signal $v_{in}$ is received by a predistortion circuit 32 which, in a manner to be explained below, produces a predistorted signal, $v_i'$, that is supplied to the input of modulator 30. As seen in FIG. 2, the input signal is divided into two paths. The majority of the signal passes undistorted through the delay line while a portion is coupled into a path with an odd order nonlinear circuit. The amounts of both third and fifth order distortion recombined with the signal at the output can be independently adjusted. The modulator is linearized to the fifth order if the amount of third and fifth order distortion produced by the predistorter is equal in magnitude and opposite in phase to the distortion that is subsequently produced in the modulator.

Figure 3:
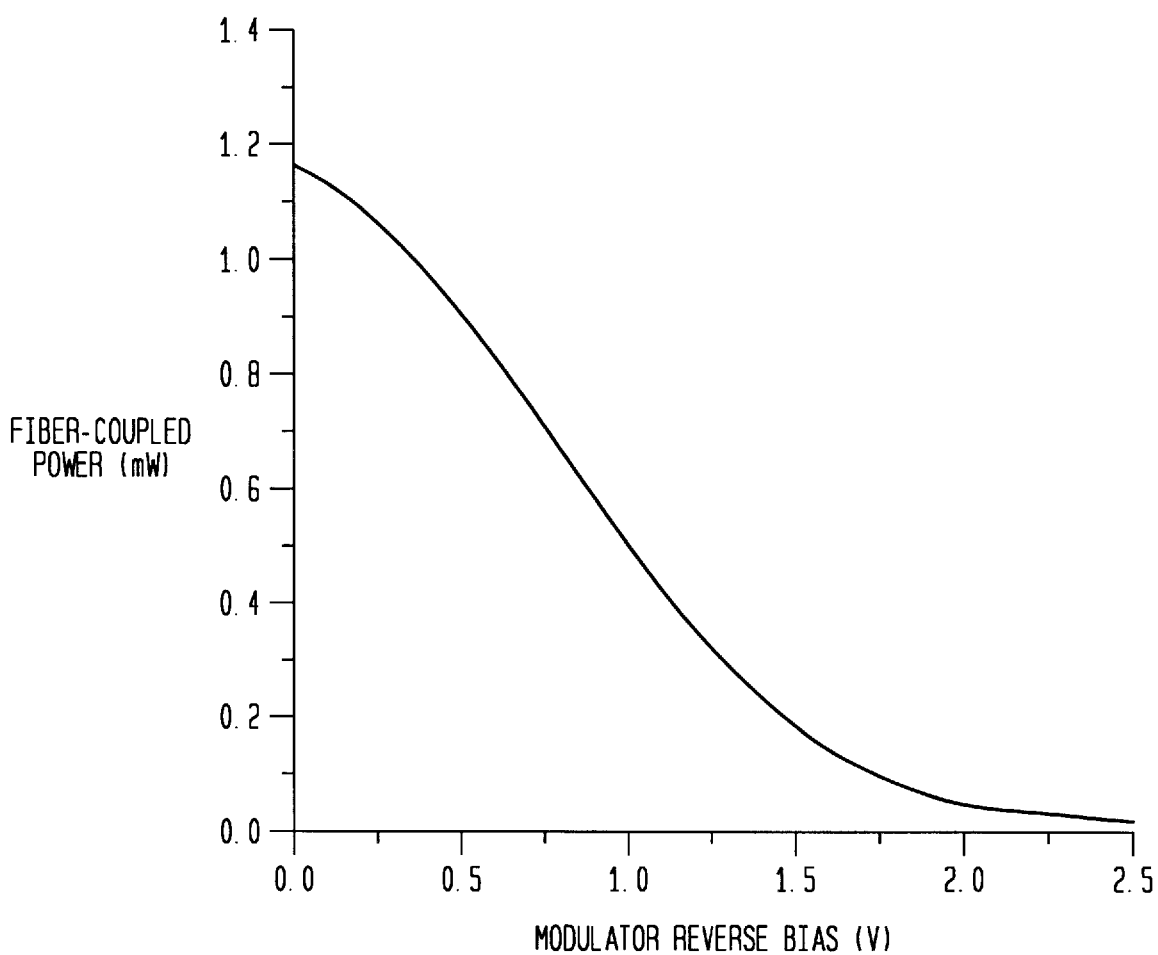
FIG. 3 is a graphical plot depicting the transmission vs. voltage curve of the electroabsorption modulator employed in the illustrative embodiment of FIG. 2.

The transfer function for a representative electroabsorption modulator is depicted in FIG. 3. As seen in FIG. 3, the transmission vs. voltage curve of an EA modulator is not inherently linear, and a large number of device parameters— such as the modulator length, the number of quantum wells, and the quantum well thickness, barrier heights, and band gap relative to the wavelength of incident light, determine the shape of the curve in a complicated fashion. Although no systematic study has been undertaken to determine how these parameters influence device linearity, the inventors herein expect that it should be possible to adjust them for optimal linearity without overly compromising modulator performance in areas such as bandwidth and extinction ratio. However, predistortion is likely to continue to be necessary in order to achieve sufficient linearity.

Figure 4:
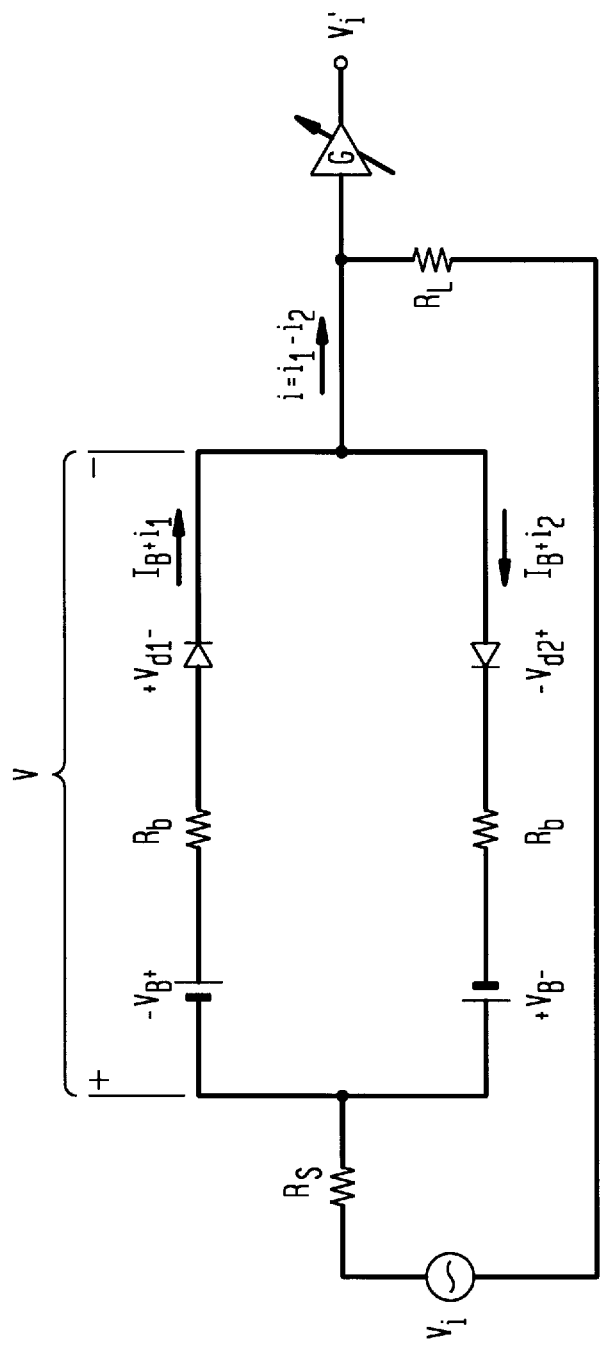
FIG. 4 depicts the odd-order nonlinear circuit element within predistortion circuit utilized by the linearized transmitter of FIG. 2.

With reference now to FIG. 4, the predistortion circuit 32 of FIG. 2 is shown in greater detail. Essentially, predistortion circuit 32 is configured to supply a predistorted signal that comprises both the multiple subcarrier signals and intermodulation products substantially equal in magnitude and opposite in phase to those associated with the non-linear transfer function of the modulator. To this end, predistortion circuit 32 comprises a diode pair comprising diodes d1 and d2 and having an odd-order voltage-current impedance function. The voltage sources are capacitors which are charged to a voltage $V_B$ by the bias current $I_B$ flowing through each diode.

Distortion cancellation to 5th-order is achieved by adjusting the gain G (FIG. 2) so that the third order and 5th-order intermodulation distortion added to the signal by the predistortion circuit 16 cancels the 3rd- and 5th-order intermodulation distortion of modulator 30. The amount of $5^{th}$-order distortion relative to $3^{rd}$-order distortion can be controlled. Thus, distortion correction to the $5^{th}$-order is achieved by varying $I_B$ in conjunction with G. The implementation of appropriate circuitry for adjusting $I_B$ is believed to be within the level of skill of those familiar with the art and for this reason, such circuitry has been omitted from FIG. 4 in the interest of clarity.

The diodes d1 and d2 have a junction capacitance of approximately 1 pF, but we will assume for now that we are operating at sufficiently low frequencies that this capacitance can be ignored. By analyzing the circuit, it can be shown that the current i flowing through the load resistor $R_L$ can be expressed as an odd-order power series $v_i$ $$i = g_1 v_i + g_3 v_i^3 + g_5 v_i^5 + g_7 v_i^7 + \ldots \tag{1}$$

$v_i$ is the input voltage to the diode pair and is some fraction of $v_{in}$ that depends on how much input power is coupled into the nonlinear circuit path.

The coefficients $g_n$ can be derived by analyzing the circuit of FIG. 4. With ac input voltage $v_i=0$, the only current flowing through the diodes is the bias current $I_B$. From the basic diode equation we have $$I_B = I_0 (e^{\beta(V_B - I_B R_b)} - 1)$$

where β is the inverse of the diode turn-on voltage and $I_0$ is the diode reverse-saturation current. With $v_i \neq 0$ additional small signal currents, $I_1$ and $I_2$, flow through diode 1 and diode 2, respectively. The voltage across the first diode is $$V_{d1} = V - (i_1 + I_B) R_b + V_B.$$

Thus, the total current flowing through the first diode is $$I_1 + I_B = I_0 (e^{\beta V_{d1}} - 1) = (I_B + I_0) e^{\beta(V - i_1 R_b)} - I_0.$$

Or, $$i_1 = I_S(e^{\beta(V-i_1 R_b)} - 1). \quad (2)$$

where $I_S = I_B + I_0$. In a similar fashion we obtain $$i_2 = I_S(e^{-\beta(V-i_1 R_b)} - 1)$$

and $$i = i_1 - i_2 = I_S(e^{\beta(V-i_1 R_b)} - e^{-\beta(V-i_1 R_b)}). \quad (3)$$

The voltage V is related to the input voltage $v_i$ by $$V = v_i - iR \quad (4)$$

where $R = R_s + R_L$. One can easily see that Equation (3) is an odd function V and also in $v_i$. Thus i can be expressed as an odd-power series in $v_i$ as given by Equation (1).

Solving for the coefficients $g_n$ requires further algebra. From Equation (2)

$$\beta V = \ln\left[1 + \left(\frac{i_1}{I_S}\right)\right] + I_S \beta R_b \left(\frac{i_1}{I_S}\right).$$

Defining $$\xi \equiv 1 + I_S \beta R_b$$

and expanding in a power series gives $$\beta V = \xi\left(\frac{i_1}{I_S}\right) - \frac{1}{2}\left(\frac{i_1}{I_S}\right)^2 + \frac{1}{3}\left(\frac{i_1}{I_S}\right)^3 - \frac{1}{4}\left(\frac{i_1}{I_S}\right)^4 + \ldots$$

Using power series reversion $$\frac{i_1}{I_S}$$

can be expressed in terms of $\beta v$ $$\frac{i_1}{I_S} = \left(\frac{1}{\xi}\right)(\beta V) + \left(\frac{1}{2\xi^3}\right)(\beta V)^2 =$$

$$\left(\frac{3-2\xi}{6\xi^5}\right)(\beta V)^3 + \left(\frac{15-20\xi + 6\xi^2}{24\xi^7}\right)(\beta V)^4 + \ldots$$

A similar formula can be derived for $i/I_S$ with $\beta \to -\beta$. Thus, $$\frac{i}{2I_S} = \frac{i_1 - i_2}{2I_S} = \left(\frac{1}{\xi}\right)(\beta V) +$$

$$\left(\frac{3-2\xi}{6\xi^5}\right)(\beta V)^3 + \left(\frac{105 - 210\xi + 130\xi^2 - 24\xi^3}{120\xi^7}\right)(\beta V)^5 + \ldots$$

Applying series reversion again and using (4):

$$\beta v_i = \eta\left(\frac{i}{2I_S}\right) - \frac{3-2\xi}{6\xi}\left(\frac{i}{2I_S}\right)^3 - \quad (5)$$

$$\left(\frac{5 - 30\xi + 30\xi^2 + 8\xi^3}{40\xi^3}\right)\left(\frac{i}{2I_S}\right)^5 +$$

$$\left(\frac{144\xi^5 - 924\xi^4 + 2016\xi^3 - 1764\xi^2 + 546\xi - 315}{1008\xi^5}\right)\left(\frac{i}{2I_S}\right)^7 \ldots$$

where $\eta \equiv 1 + I_S \beta(R_b + 2R)$.

A final power series reversion yields (1), where the coefficients are given to $7^{th}$-order by $$g_1 = \frac{2I_S \beta}{\eta} \quad (6)$$

$$g_3 = \frac{2I_S \beta^3 (3 - 2\xi)}{3! \eta^4 \xi} \quad (7)$$

$$g_5 = \frac{2I_S \beta^5 (40\xi^3 + 90\xi - 120\xi^2 - 24\eta\xi^3 + 90\eta\xi^3 - 90\eta\xi + 15\eta)}{5! \eta^7 \xi^3} \quad (8)$$

$$g_7 = \frac{2I_S \beta^7 \to I_S^7}{7! \eta^{10} \xi^5}(7560\xi^2 - 2240\xi^5 - 15120\xi^3 + 10080\xi^4 + \quad (9)$$

$$2688\eta\xi^5 - 2520\eta\xi - 16800\eta\xi^2 + 25200\eta\xi^3 - 14112\eta\xi^4 - 720\eta^2\xi^5 +$$

$$4620\eta^2\xi^4 - 10080\eta^2\xi^3 + 8820\eta^2\xi^2 - 2730\eta^2\xi + 315\eta^2).$$

Using Equations (6)–(9), the amount of predistortion of each order can be determined from the circuit parameters. The voltage input to the amplifier of gain G is $iR_L$. By varying G, the intermodulation product amplitudes can be varied relative to the undistorted signal passing through the delay line. The fundamental power which passes through the diodes (proportional to $g_1^2$ at low frequencies) is much smaller than that which passes through the delay line. Since varying G varies all orders of intermodulation distortion (IMD) by the same amount, another degree of freedom is necessary in order to independently tune the $3^{rd}$-order (IMD3) and the $5^{th}$-order (IMD5) intermodulation distortion produced. For a certain combination of circuit parameters $g_5 = 0$. According to the present invention, both the relative magnitude and relative phase of IMD3 and IMD5 can be varied over a broad range by varying $I_B$ in the vicinity of this null.

In order to estimate the value of $I_B$ for which $g_5 = 0$, some approximations can be made. Typically $I_S \beta R_b < 1$. Therefore, the numerator of Equation (8) can be expanded and terms in $I_S \beta R_b$ can be kept to $1^{st}$-order. Also $I_B > I_0$ so $I_S \cong I_B$. With these approximations the condition for nulling $g_5$ is $$I_B \cong \frac{1}{3\beta(6R + 7R_b)}. \quad (10)$$

The derivation of Equations (6)–(9) assumed that the input signal was limited to sufficiently low frequency such that the junction capacitance of the diodes can be ignored. The frequency response is important to consider, however, since the distortion produced by the predistorter must be roughly frequency independent over the CATV band in order to cancel the EA modulator distortion. The frequency response is estimated by considering the RC circuit depicted in FIG. 4. $R_d = 1/I_S\beta + R_b$ and $C_d$ are the dynamic resistance and junction capacitance of each diode. The current through the capacitor is given by $$i_c = \frac{v_i}{R}\left(\frac{j\omega R_t C_d}{1 + j\omega R_t C_d}\right) \quad (11)$$

where

-continued $$R_t = \frac{R_d R}{R + R_d/2}.$$

Likewise, to $1^{st}$-order, the current through the diodes is $$i_d = v_i \frac{R_t}{R_d R} \left( \frac{1}{1 + j\omega R_t C_d} \right).$$

Thus, the total signal bleed-through (i.e., the amount of fundamental power that passes through the diode pair) is given by, $$\left| \frac{i_d + i_c}{v_i} \right| = \frac{R_t}{R_d R} \left[ \frac{1 + (\omega R_d C_d)^2}{1 + (\omega R_t C_d)^2} \right]^{1/2}. \quad (12)$$

The bleed-through increases with frequency and can cause the amplifier G to produce spurious $2^{nd}$-order distortion if it is not sufficiently linear.

The amount of predistortion produced in the diode pair decreases the frequency because the current shunted through $2C_d$ produces an additional voltage drop across R and thus reduces the voltage across the diodes for a given $v_i$. To $1^{st}$-order approximation, equations (6)–(9) can be modified to account for this effect if we replace $v_i$ in (1) with $$\tilde{v}_i = v_i - i_c R. \quad (13)$$

The new frequency-dependent expansion for i is in terms of new frequency-dependent coefficients $\tilde{g}_n$ $$i \approx \tilde{g}_1 v_i + \tilde{g}_3 v_i^3 + \tilde{g}_5 v_i^5 + \tilde{g}_7 v_i^7 + \ldots \quad (14)$$

Using Equations (11) in (13) and solving for $\tilde{v}_i$ yields $$\tilde{v}_i = \frac{v_i}{1 + j\omega R_t C_d}. \quad (15)$$

by substitution of (15) and (1) in place of $v_i$, (14) is obtained. The new, frequency-dependent coefficients $\tilde{g}_n$ are given by $$\tilde{g}_n = \frac{g_n}{[1 + (\omega R_t C_d)^2]^{\frac{n}{2}}} \quad (16)$$

The performance of a predistortion circuit in accordance with the present invention can be evaluated and compared to the predictions of the analysis above with a 2-tone test. The nonlinear circuit of FIG. 4 was tested in isolation. The diodes used had the following characteristics: $R_b \approx 5 \ \Omega, \beta = 34.84 \ V^{-1}$, and $C_d \approx 1.0$ pF. Also $R_S = R_L = 25 \ \Omega$. The bias current was varied from 8 to 50 $\mu$A.

Normatively, the predistorter should produce sufficient $3^{rd}$- and $5^{th}$-order distortion to cancel these terms in the modulator, but the amount of $7^{th}$- and higher odd-order distortion produced must be small. The expansion of $v_i$ in Equation (5) is only valid if $i/(2I_B) < 1$, and high-order distortion will become significant as $i/(2I_B)$ approaches 1. Thus, it is important to maintain $v_i$ below a certain critical voltage. To obtain $1^{st}$-order, $v_i = \eta i/(2I_B \beta)$. Thus, it is required that $$v_i < \eta/\beta.$$

If $I_B$ is to be varied over a range extending to 50 $\mu$A, this requirement becomes $v_i < 31$ mV.

Figure 5B:
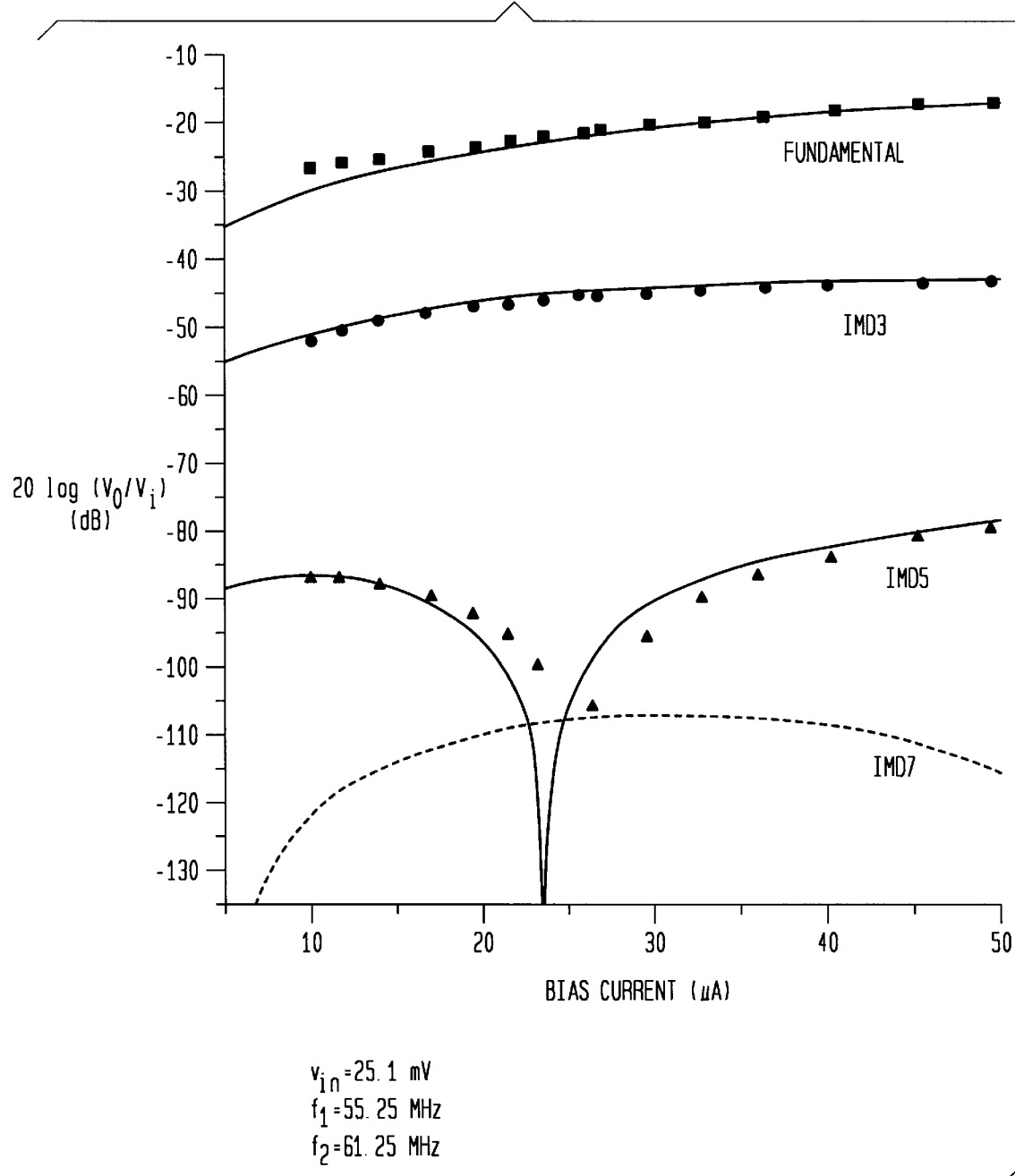

Both measured and theoretical 2-tone IMD are shown for two tones at 55.25 Mhz and 61.25 Mhz in FIG. 5(a) with $v_{imax} = 17.8$ mV and 5(b) with $v_{imax} = 25.1$ mV. In both cases G=1. Experimentally, the $7^{th}$-order intermodulation distortion (IMD7) was below the noise floor. The theoretical curves were generated using Equations (6)–(9) and no frequency dependent effects are included. Thus, the measured fundamental bleed-through deviates from the theory at low bias currents because, as $R_d$ increases, the amount of fundamental leaking through the capacitance $C_d$ becomes significant. Equation (10) predicts that $g_5=0$ at $I_B=28.6 \ \mu$A, which agrees well with the null at $I_B=28.8 \ \mu$A predicted by Equation (8). Notice that the measured null in IMD5 is near $I_B=25 \ \mu$A and this null moves to lower bias current with increasing input power. IMD5 is affected by $7^{th}$- and higher odd-order terms in the power series expansion, and these terms become more important as the input power increases. The plotted theoretical curves include terms up to $7^{th}$-order and the deviation between theory and experiment may be due to still higher-order terms. The calculated IMD7 is well below IMD5 for most biases, but becomes significant near the null, especially at the higher input voltage $v_{imax}=25.1$ mV. The ratio |IMD5/IMD3| can be continuously varied from zero to −35 dB, with IMD3 and IMD5 either in phase or 180° our of phase, simply by adjusting $I_B$. The smallest usable value of |IMD5/IMD3| is typically limited by the noise figure of the amplifier G.

Figure 6A:
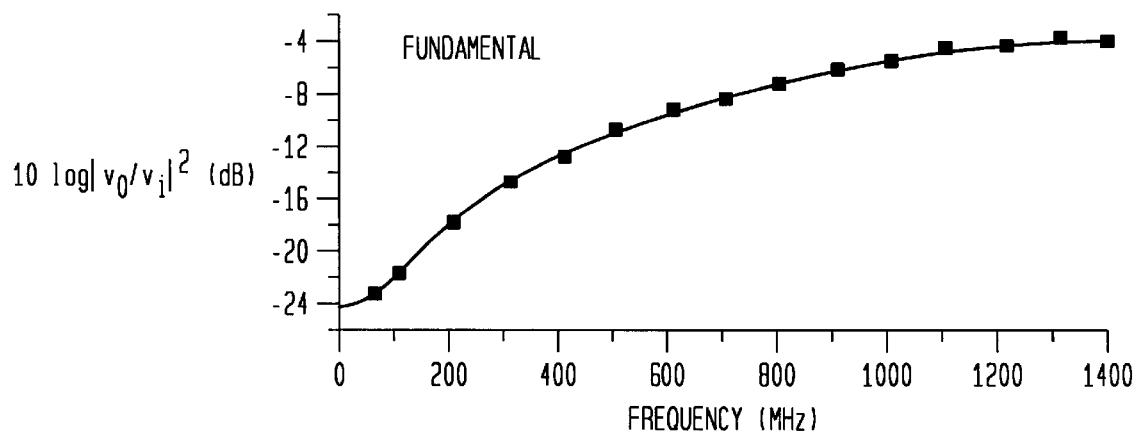
FIG. 6a, 6b, and 6c depict measured and theoretical frequency response of the non-linear circuit with IMD measured using two tones closely spaced in frequency.
Figure 6B:
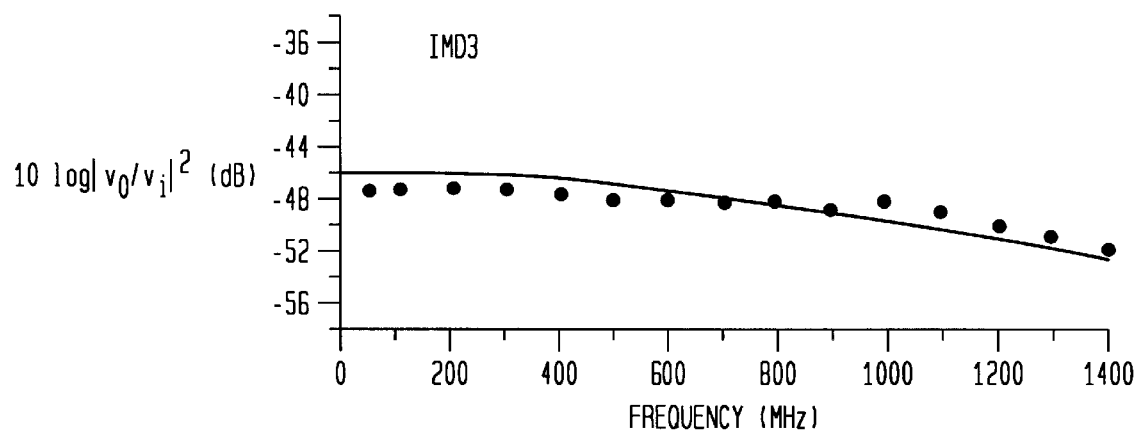
Figure 6C:
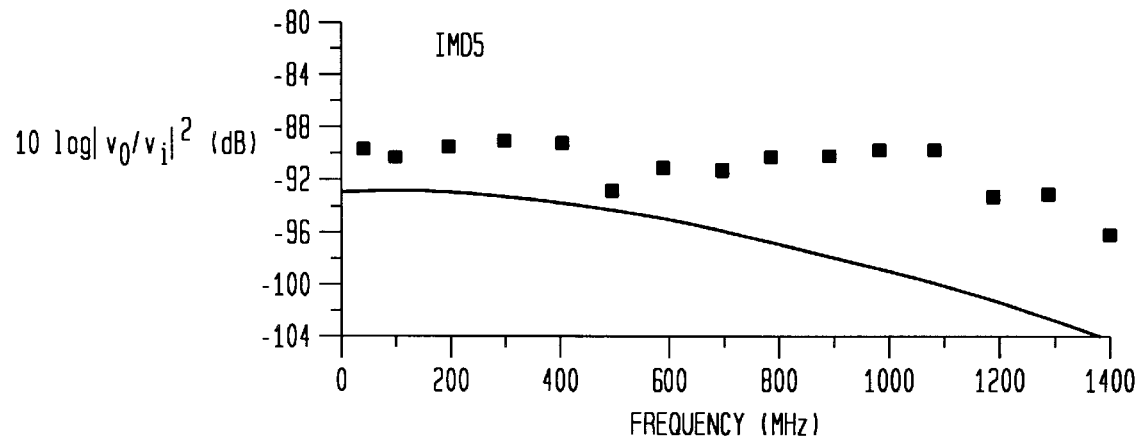

Distortion cancellation requires that the IMD produced be constant over the CATV band, which extends from 55 to 550 Mhz for 80 channels. By varying the center frequency of a pair of closely spaced tones, the frequency response of the circuit was determined. A bias current of 19 $\mu$A was chosen since this bias yielded low CTB when predistorting an EML. FIG. 6(a) compares measured fundamental power to that predicted by Equation (12). In FIGS. 6(b) and 6(c) the theoretical IMD curves generated using Equations (12), (14), and (16) somewhat over estimate the measured roll-off. The measured IMD3 and IMD5 are actually relatively flat over the CATV band.

Figure 7:
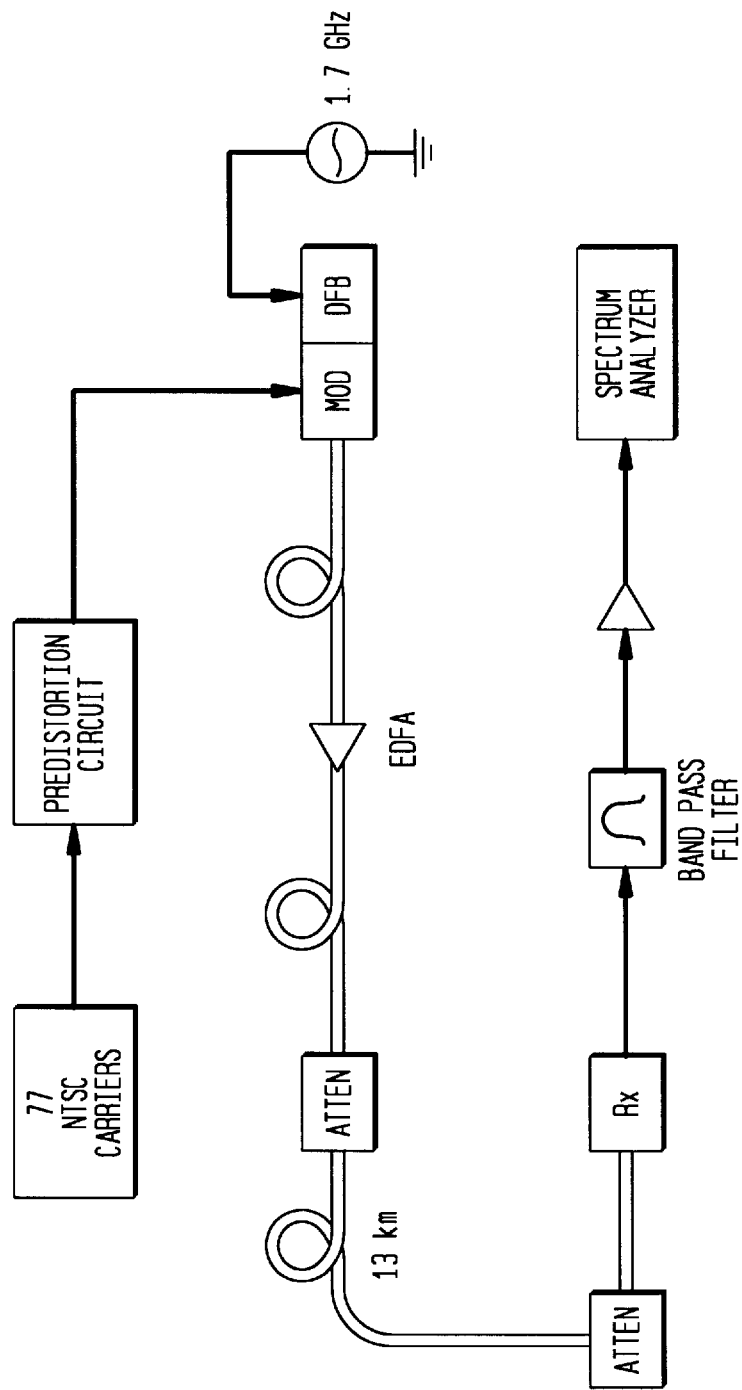
FIG. 7 depicts an investigative apparatus constructed to evaluate the performance of a linearized optical transmitter constructed in accordance with the present invention.
Figure 8:
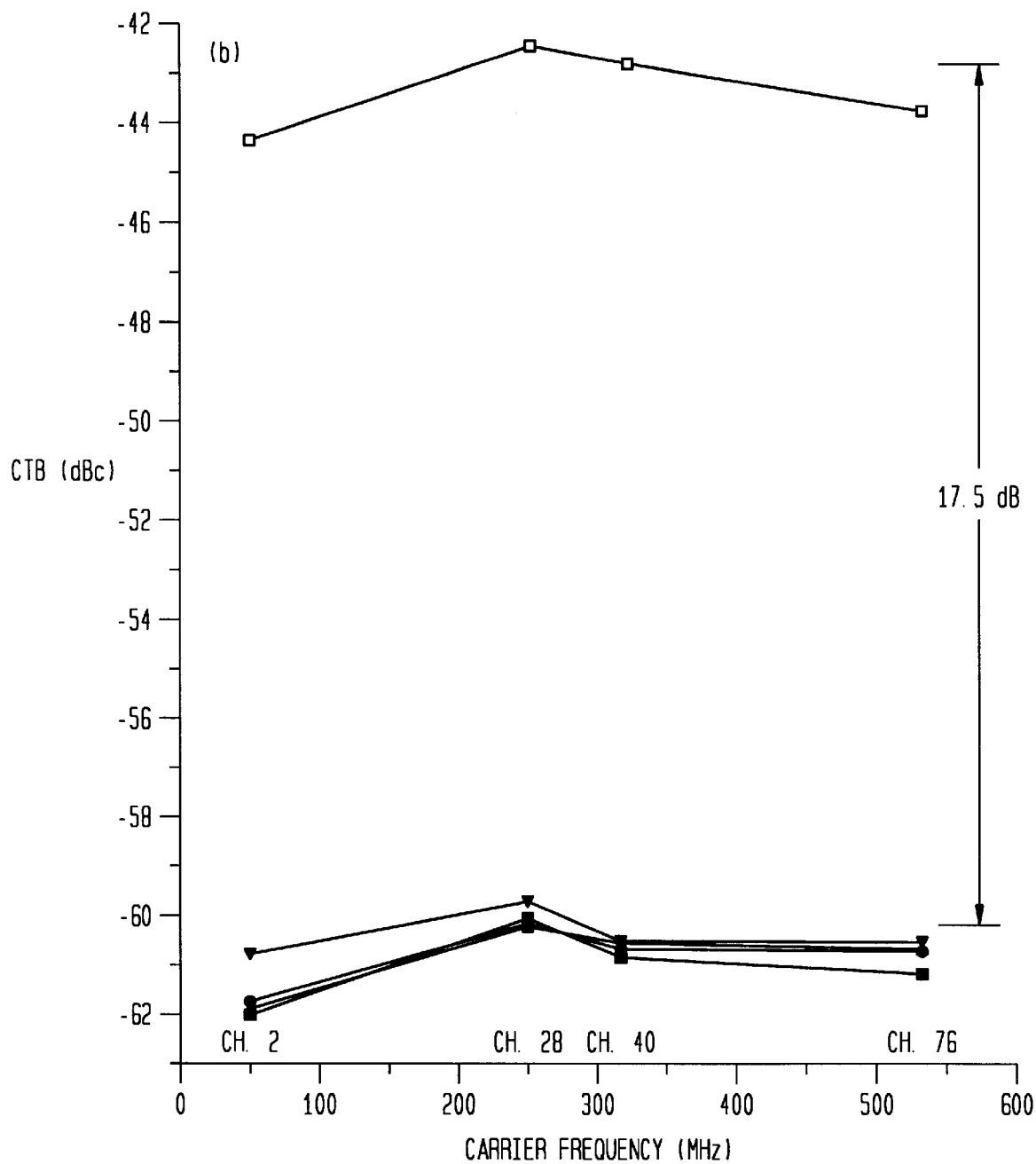
FIG. 8 depicts CSO and CTB for 77 channels and OMD of 3.3% per channel at four channels in the apparatus of FIG. 5.

The predistortion circuit of the present invention was included in the experimental link shown in FIG. 7 Seventy-seven unmodulated rf carriers, corresponding to NTSC channels between 55.25 and 535.25 Mhz (including channels 98 and 99), are passed through the predistorter and then applied to the modulator section of the EML, yielding an optical modulation depth (OMD) of 3.3% per carrier. The modulator is biased at −0.800 V, near the inflection point of its transmission function, and the average optical power launched into fiber is −1.8 dBm. In FIG. 8 the composite second-order (CSO) and composite triple-beat (CTB) measured directly from the EML at the highest, lowest, and two mid-band channels are shown. The highest CSO is −60.8 dBc. Predistortion reduces the worst-case CTB, at Ch. 28, by 17.3 dB to −60.1 dBc. This CTB is 6 dB better than that previously obtained with correction to $3^{rd}$-order only. The optical bias current is 19 $\mu$A. A bias current of 30 $\mu$A yields a CTB which is several dB worse.

Fiber amplification and transmission through 13 km of non-dispersion shifted fiber did not increase the worst-case CSO and CTB because of the EML's low chirp. In order to raise the threshold for stimulated Brillouin scattering (SBS) and to reduce multi-path interference (MPI), a 1.7 Ghz dither was applied to the laser section of the EML, broadening its linewidth. Using this technique, the SBS threshold was increased from +8 to +13.4 dBm, and the transmission-fiber launch power is increased from +4.1 to +13.4 dBm with only 0.3 dB increase in worst-case CTB.

The carrier-to-noise ratios (CNRs) at four channels are plotted in FIG. 9. The back-to-back CNR is 50.9 dB. The introduction of the EDFA and fiber reduces the CNR of the lowest frequency channels more than that of the higher frequency channels due to MPI. Dithering the laser eliminates the MPI noise in the lowest channel and suppresses the CNR degradation normally caused by SBS. The resulting link CNR, 47 dB, is limited primarily by the average fiber-coupled power of the EML (−1.8 dBm).

Although modifications and changes may be suggested by those skilled in the art, it is the intention of the inventors to embody within the patent warranted hereon all changes and modifications as reasonably and properly come within the scope of their contribution to the art.

What is claimed is:

1. A linearized optical transmitter for transmitting multiple subcarrier signals via an optical medium, comprising:
    a modulated optical source responsive to a time varying electrical input signal to supply a time varying optical output signal containing said multiple subcarrier signals, said modulated optical source being characterized by a non-linear transfer function such that intermodulation of said multiple subcarrier signals occurs; and
    a predistortion circuit for supplying a predistorted signal comprising said multiple subcarrier signals and intermodulation products substantially equal in magnitude and opposite in phase to those associated with said non-linear transfer function such that odd-order subcarrier intermodulation distortion products in the optical output signal are substantially canceled through the fifth order, said predistortion circuit including:
        an antiparallel diode arrangement including a first diode having an anode coupled to a first circuit node, and a second diode having a cathode coupled to said first circuit node,
        a biasing circuit arrangement coupled to said antiparallel diode arrangement for causing D.C. bias current to flow through each of said diodes, and
        a load impedance coupled to said antiparallel diode arrangement for extracting signal current therefrom;
        whereby input to said non-linear signal path incident on said antiparallel diode arrangement produces significant third and fifth order intermodulation predistortion products and wherein said biasing circuit arrangement is operable to control the relative magnitude and sign between said third and fifth order intermodulation predistortion products.

2. The optical transmitter of claim 1, wherein said modulated optical source comprises a directly modulated, diode laser.

3. The optical transmitter of claim 1, wherein said modulated optical source comprises an externally modulated laser.

4. The optical transmitter of claim 1, wherein the predistortion circuit includes:
    a power splitter for dividing an input signal;
    a linear signal path having a delay for receiving a first portion of said input signal and for providing a first output signal portion;
    a non-linear signal path for receiving a second portion of an input signal and for providing a second output signal, said non-linear signal path having substantially the same delay as said linear signal path and including an antiparallel diode arrangement including a first diode having an anode coupled to a first circuit node, and a second diode having a cathode coupled to said first circuit node,
        a biasing circuit arrangement coupled to said antiparallel diode arrangement for causing D.C. bias current to flow through each of said diodes, and
        a load impedance coupled to said antiparallel diode arrangement for extracting signal current therefrom; and
        a power combiner for recombining said linear and non-linear signal paths;
    whereby said antiparallel diode arrangement is responsive to said second input signal portion to introduce significant third and fifth order intermodulation predistortion products to thereby form a second output signal portion, wherein said biasing circuit arrangement is operable to control the relative magnitude and sign between said third and fifth order intermodulation predistortion products.

5. The optical transmitter of claim 4, wherein the non-linear signal path further includes a gain varying arrangement coupled to said antiparallel diode arrangement for varying the amplitude of the second output signal portion relative to said first output signal portion, and wherein said first and second output signals are combined at said combiner to form said predistortion signal.

6. The optical transmitter of claim 5, wherein said gain varying arrangement includes a variable attenuator.

7. The optical transmitter of claim 5, wherein said gain varying arrangement includes a variable gain amplifier.

8. An optical communication system comprising:
    a linearized optical transmitter for transmitting multiple subcarrier signals including:
        a modulated optical source responsive to a time varying electrical input signal to supply a time varying optical output signal containing said multiple subcarrier signals, said modulated optical source being characterized by a non-linear transfer function such that intermodulation of said multiple subcarrier signals occurs; and
        a predistortion circuit for supplying a predistorted signal comprising said multiple subcarrier signals and intermodulation products substantially equal in magnitude and opposite in phase to those associated with said non-linear transfer function such that odd-order subcarrier intermodulation distortion products in the optical output signal are substantially canceled through the fifth order, said predistortion circuit including
            an antiparallel diode arrangement including a first diode having an anode coupled to a first circuit node, and a second diode having a cathode coupled to said first circuit node,
            a biasing circuit arrangement coupled to said antiparallel diode arrangement for causing D.C. bias current to flow through each of said diodes, and
            a load impedance coupled to said antiparallel diode arrangement for extracting signal current therefrom;
            whereby input to said non-linear signal path incident on said antiparallel diode arrangement produces significant third and fifth order intermodulation predistortion products and wherein said biasing circuit arrangement is operable to control the relative magnitude and sign between said third and fifth order intermodulation predistortion products;
    at least one receiver for receiving at least one of said multiple subcarrier signals; and
    an optical transmission medium coupled between said transmitter and said at least one receiver.

9. The optical transmitter of claim 8, wherein said modulated optical source comprises a directly modulated, diode laser.

10. The optical transmitter of claim 8, wherein said modulated optical source comprises an externally modulated laser.

11. The optical transmitter of claim 8, wherein the predistortion circuit includes:

a power splitter for dividing an input signal;

a linear signal path having a delay for receiving a first portion of said input signal and for providing a first output signal portion;

a non-linear signal path for receiving a second portion of an input signal and for providing a second output signal, said non-linear signal path having substantially the same delay as said linear signal path and including an antiparallel diode arrangement including a first diode having an anode coupled to a first circuit node, and a second diode having a cathode coupled to said first circuit node, a biasing circuit arrangement coupled to said antiparallel diode arrangement for causing D.C. bias current to flow through each of said diodes, and a load impedance coupled to said antiparallel diode arrangement for extracting signal current therefrom; and a power combiner for recombining said linear and non-linear signal paths;

whereby said antiparallel diode arrangement is responsive to said second input signal portion to introduce significant third and fifth order intermodulation predistortion products to thereby form a second output signal portion, wherein said biasing circuit arrangement is operable to control the relative magnitude and sign between said third and fifth order intermodulation predistortion products.

12. The optical transmitter of claim 11, wherein the non-linear signal path further includes a gain varying arrangement coupled to said antiparallel diode arrangement for varying the amplitude of the second output signal portion relative to said first output signal portion, and wherein said first and second output signals are combined at said combiner to form said predistortion signal.

13. The optical transmitter of claim 12, wherein said gain varying arrangement includes a variable attenuator.

14. The optical transmitter of claim 12, wherein said gain varying arrangement includes a variable gain amplifier.

15. A linearized optical transmitter for transmitting multiple subcarrier signals via an optical medium, comprising:

a modulated optical source responsive to a time varying electrical input signal to supply a time varying optical output signal containing said multiple subcarrier signals, said modulated optical source being characterized by a non-linear transfer function such that intermodulation of said multiple subcarrier signals occurs; and a predistortion circuit for supplying a predistorted signal comprising said multiple subcarrier signals and intermodulation products substantially equal in magnitude and opposite in phase to those associated with said non-linear transfer function such that odd-order subcarrier intermodulation distortion products in the optical output signal are substantially canceled through the fifth order, wherein said predistortion circuit includes two adjustable parameters thereby providing two degrees of freedom such that the magnitude and relative sign of the $5^{th}$ and $3^{rd}$ order distortion may be controlled over a broad range.

16. The optical transmitter of claim 15, wherein said two adjustable parameters include a diode bias current adjustment and an amplifier gain adjustment.

17. The optical transmitter of claim 16, wherein said optical source comprises a directly modulated, diode laser.

18. The optical transmitter of claim 15, wherein said modulated optical source comprises an externally modulated laser.

* * * * *